United States Patent
Goto et al.

(10) Patent No.: US 8,432,966 B2
(45) Date of Patent: *Apr. 30, 2013

(54) COMMUNICATION APPARATUS AND CONTROL METHOD FOR COMMUNICATION APPARATUS

(75) Inventors: Masataka Goto, Yokohama (JP); Shinya Murai, Kawasaki (JP); Kensaku Yamaguchi, Yokohama (JP); Shingo Tanaka, Yokohama (JP); Yasuyuki Nishibayashi, Kawasaki (JP); Hiroshi Kawazoe, Yokohama (JP); Mika Minematsu, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/494,885

(22) Filed: Jun. 12, 2012

(65) Prior Publication Data

US 2012/0250756 A1 Oct. 4, 2012

Related U.S. Application Data

(63) Continuation of application No. 11/902,012, filed on Sep. 18, 2007, now Pat. No. 8,223,834.

(30) Foreign Application Priority Data

Oct. 31, 2006 (JP) .................................. 2006-296884

(51) Int. Cl.
*H04N 11/02* (2006.01)
*H04N 5/775* (2006.01)
*H04N 5/917* (2006.01)

(52) U.S. Cl.
USPC ....... 375/240.01; 386/230; 386/355; 386/356

(58) Field of Classification Search .................. None
See application file for complete search history.

(56) References Cited

U.S. PATENT DOCUMENTS

| | | | |
|---|---|---|---|
| 8,223,834 B2* | 7/2012 | Goto et al. ............... | 375/240.01 |
| 2001/0046260 A1 | 11/2001 | Molloy | |
| 2005/0036373 A1 | 2/2005 | Aono et al. | |

(Continued)

FOREIGN PATENT DOCUMENTS

| | | |
|---|---|---|
| CN | 1489389 A | 4/2004 |
| CN | 1798323 A | 7/2006 |
| JP | 2005-249841 | 9/2005 |
| JP | 2005-266590 | 9/2005 |

OTHER PUBLICATIONS

Notice of Reasons for Rejection issued in Counterpart Japanese Application No. 2006-296884 on Dec. 9, 2011.

(Continued)

*Primary Examiner* — Clemence Han
(74) *Attorney, Agent, or Firm* — Finnegan, Henderson, Farabow, Garrett & Dunner, LLP

(57) ABSTRACT

A signaling unit of a display terminal establishes communication with a content server, video communication terminal, and PC server through a communication unit, and transmits/receives image data compressed by MPEG2, MPEG4, and JPEG. A media control unit switches compression schemes for decoding in a media processing unit on the basis of the received image data. The media processing unit performs decoding processing including inverse orthogonal transformation processing and dequantization processing in accordance with the switched compression scheme. At this time, a single processing circuit performs inverse orthogonal transformation processing and dequantization processing.

6 Claims, 8 Drawing Sheets

U.S. PATENT DOCUMENTS

| | | |
|---|---|---|
| 2005/0267943 A1 | 12/2005 | Castaldi et al. |
| 2007/0121720 A1 | 5/2007 | Yamane et al. |
| 2007/0168046 A1 | 7/2007 | Misawa et al. |
| 2008/0201751 A1 | 8/2008 | Ahmed et al. |
| 2008/0262996 A1 | 10/2008 | Yogeshwar et al. |
| 2008/0263020 A1 | 10/2008 | Takehara et al. |
| 2009/0310671 A1 | 12/2009 | Reynolds et al. |
| 2010/0272173 A1 | 10/2010 | Puri et al. |

OTHER PUBLICATIONS

The First Office Action issued by the Chinese Patent Office on Apr. 15, 2010, for Chinese Patent Application No. 200710166608.1, and English-Language translation thereof.

Richardson, et al., "Virtual Network Computing," *IEEE Internet Computing*, vol. 2, No. 1, pp. 33-38 (Jan./Feb. 1998).

\* cited by examiner

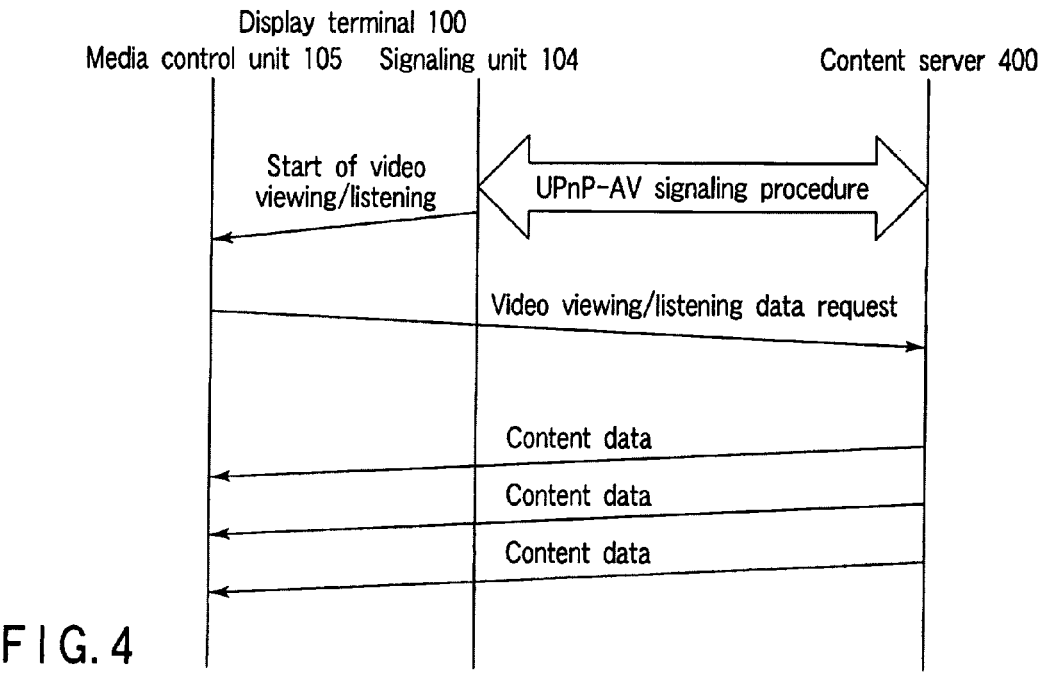
F I G. 4
| Type of service | Video viewing/listening |
| --- | --- |
| Type of media stream | MPEG2-PS |
| URI of content | http://192.168.0.200:20080/RD_00010001_VRO.csi |
F I G. 5
F I G. 6  GET http://192.168.0.200:20080/RD_001001_VRO.csi
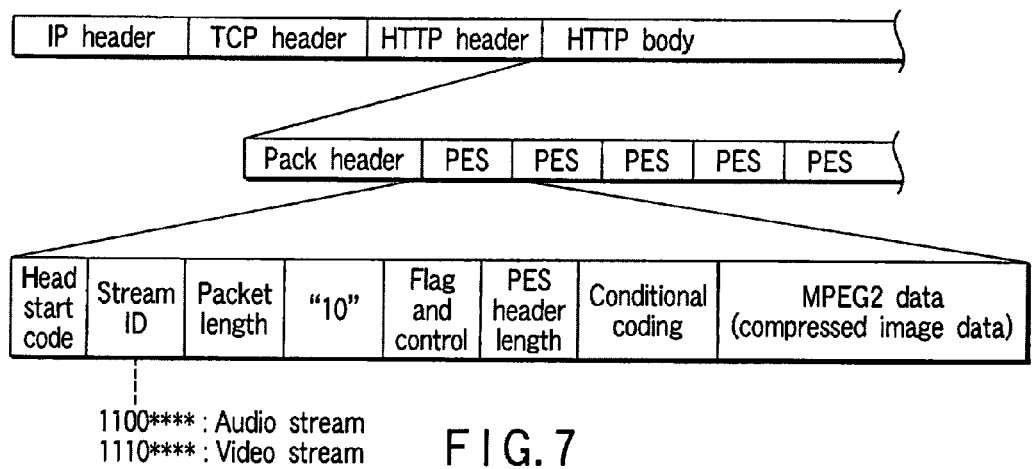
1100**** : Audio stream
1110**** : Video stream
F I G. 7

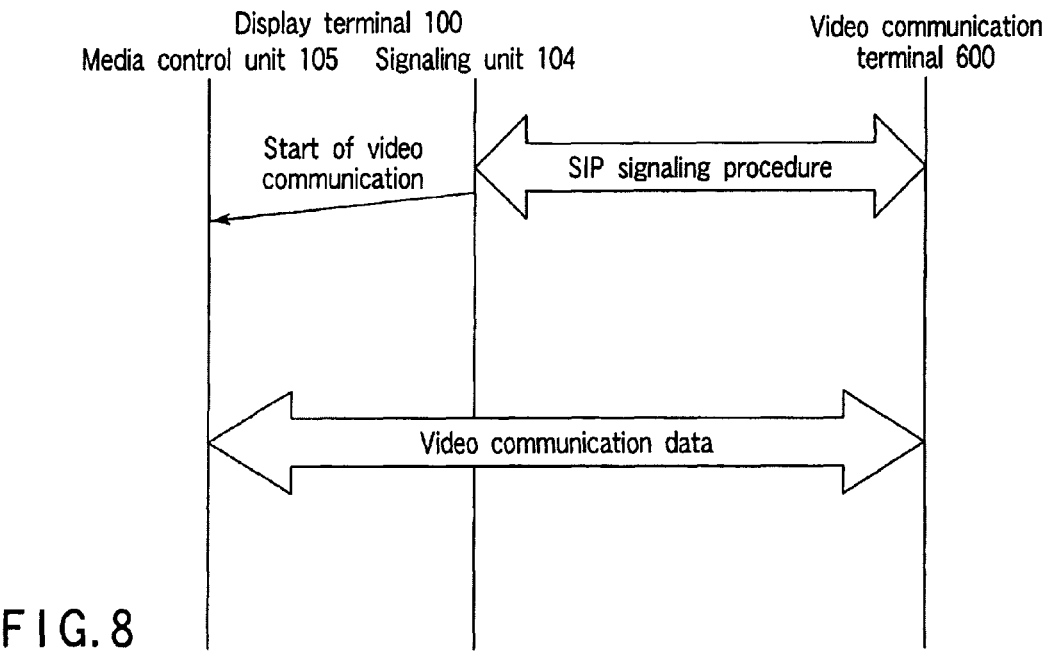
FIG. 8
FIG. 9
| Type of service | Video communication |
| Type of media stream | RTP/MPEG4 |
| Connection destination IP address | 192.168.0.100 |
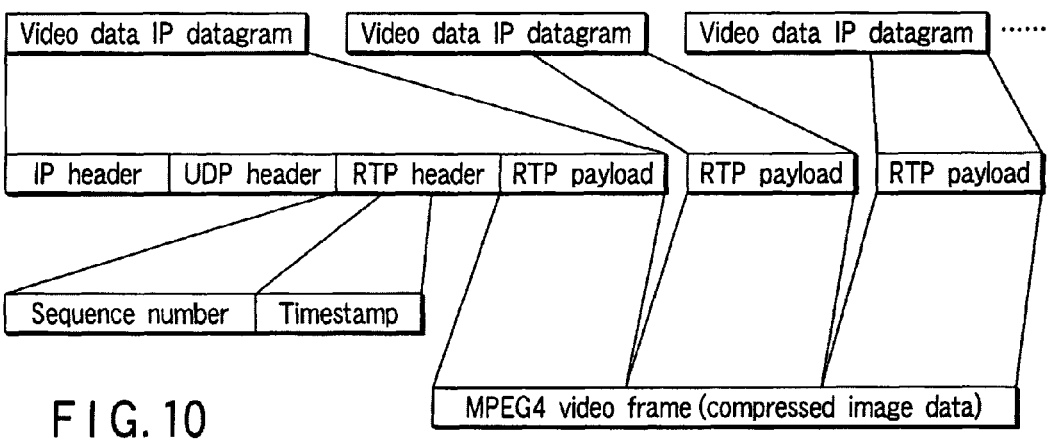
FIG. 10

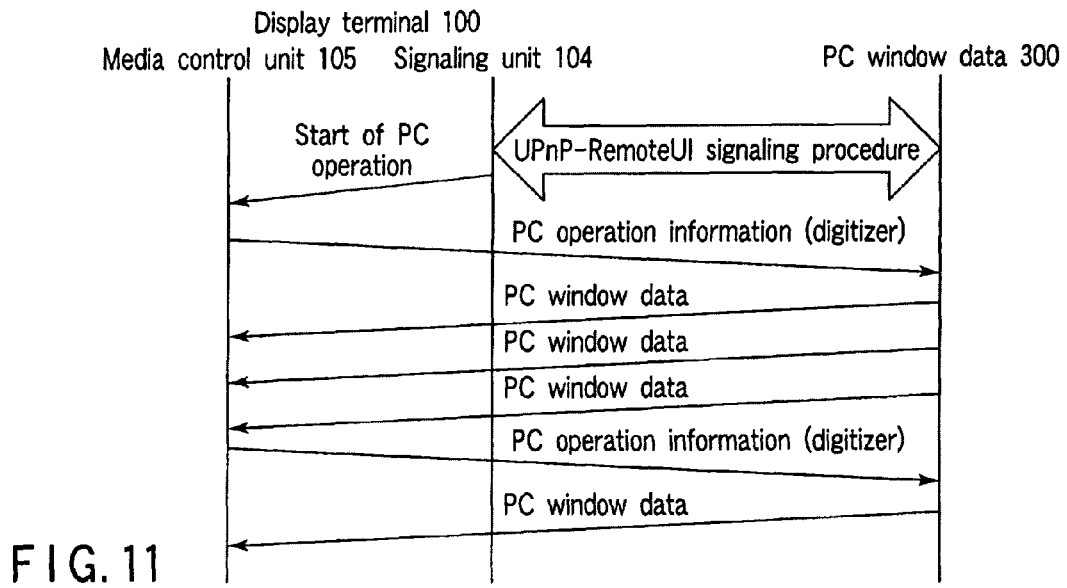
FIG. 11
| Type of service | PC operation |
|---|---|
| Type of media stream | JPEG |
| Connection destination IP address | 192.168.0.1 |
FIG. 12
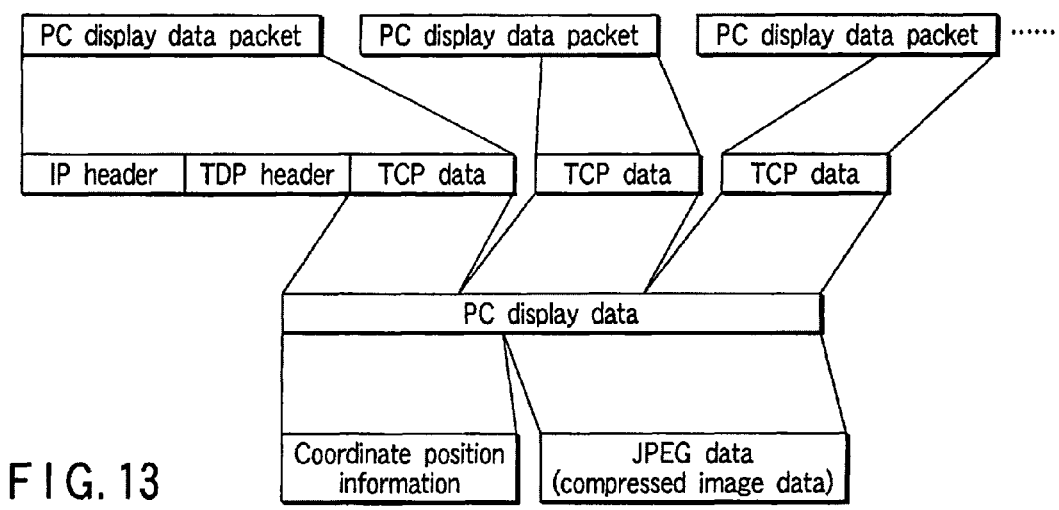
FIG. 13

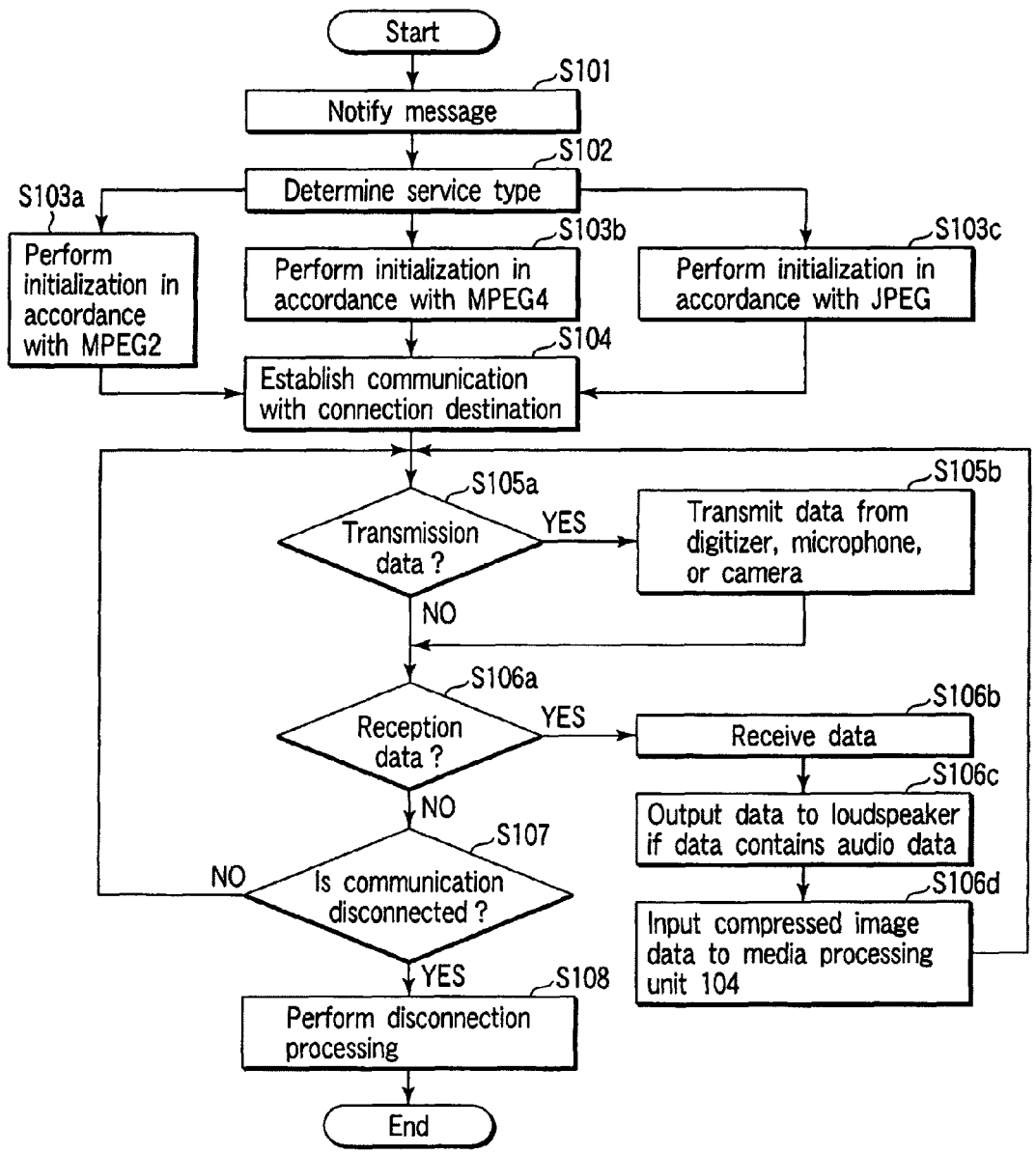
F I G. 14

COMMUNICATION APPARATUS AND CONTROL METHOD FOR COMMUNICATION APPARATUS

CROSS-REFERENCE TO RELATED APPLICATIONS

This application is a continuation of U.S. application Ser. No. 11/902,012, filed on Sep. 18, 2007 now U.S. Pat. No. 8,223,834, which is incorporated herein by reference.

This application is based upon and claims the benefit of priority from prior Japanese Patent Application No. 2006-296884, filed Oct. 31, 2006, the entire contents of which are incorporated herein by reference.

BACKGROUND OF THE INVENTION

1. Field of the Invention

The present invention relates to a communication apparatus which can receive image data transmitted from a server on a network by wireless communication and display the image data, and a control method for the apparatus.

2. Description of the Related Art

A network computing technique has been researched and developed as a new style of computing which uses a network (see, for example, Tristan Richardson, Quentin Stafford-Fraser, Kenneth R. Wood, and Andy Hopper, "Virtual Network Computing", IEEE Internet Computing, Vol. 2, No. 1, January/February 1998).

According to conventional computing, a user's computer terminal (e.g., a PC) stores various application programs in advance, and uses the application programs by activating them as needed. In contrast to this, network computing implements the operation of downloading application programs to be used from a server apparatus on a network and using them as needed. Using such a network computing system makes it possible to downsize a device by limiting functions required for a computer terminal on the user side.

Various digital devices can connect to a network through wireless communication as can be seen in the recent widespread use of cellular phones which can connect to a network. Such a tendency toward the use of network services through wireless communication is expected to increase in various cases. In order to satisfy user requests to use various kinds of services, it is very important to implement a communication terminal which is very compact and can cope with various services using sophisticated functions like those of a conventional mobile computer.

In a network computing system like that described above, however, a terminal on the user side needs to have a calculating ability for the operation of application programs to be downloaded and used. This is one of the bottlenecks in the miniaturization and weight reduction of a terminal on the user side.

On the other hand, a portable terminal such a cellular phone cannot make full use of the sophisticated graphic function implemented by an application program operating on a desktop (or notebook) personal computer.

BRIEF SUMMARY OF THE INVENTION

According to the present invention, there is provided a communication apparatus for decoding and displaying image data received by wireless communication. In this apparatus, a communication establishing unit establishes wireless communication with each of a computer which transmits application window data generated by executing an application program, a communication terminal which transmits video image data for video communication, and a content server which transmits content data containing a moving image.

A reception unit receives the application window data, the video image data, and the content data from the computer, the communication terminal, and the content server, respectively, after wireless communication has been established by the communication establishing unit.

A generating unit generates display image data to be displayed on a display unit by decoding the received application window data, the received video image data, and the received content data in correspondence with compression schemes of the respective data.

A control unit switches decoding schemes in the generating unit in correspondence with the compression schemes of the application window data, the video image data, and the content data.

Each of the application window data, the video image data, and the content data has been coded by using a compression scheme including orthogonal transformation processing of transforming two dimensional image data into image data in a spatial frequency domain and quantization processing for the image data having undergone the orthogonal transformation processing, and the generating unit implements inverse orthogonal transformation processing and dequantization processing for decoding the application window data, the video image data, and the content data by a single processing circuit.

BRIEF DESCRIPTION OF THE SEVERAL VIEWS OF THE DRAWING

FIG. 4 is a communication sequence chart at the time of "video viewing/listening";

FIG. 5 is a view showing message contents at the time of "video viewing/listening";

FIG. 6 is a view showing a request message of content data;

FIG. 7 is a view showing the structure of communication data at the time of "video viewing/listening";

FIG. 8 is a communication sequence chart at the time of "video communication";

FIG. 9 is a view showing message contents at the time of "video communication";

FIG. 10 is a view showing the structure of communication data at the time of "video communication";

FIG. 11 is a communication sequence chart at the time of "PC operation";

FIG. 12 is a view showing message contents at the time of "PC operation";

FIG. 13 is a view showing the structure of communication data at the time of "PC operation";

FIG. 14 is a flowchart showing operation at the time of use of a service;

DETAILED DESCRIPTION OF THE INVENTION

An embodiment of the present invention will be described below.

Figure 1:
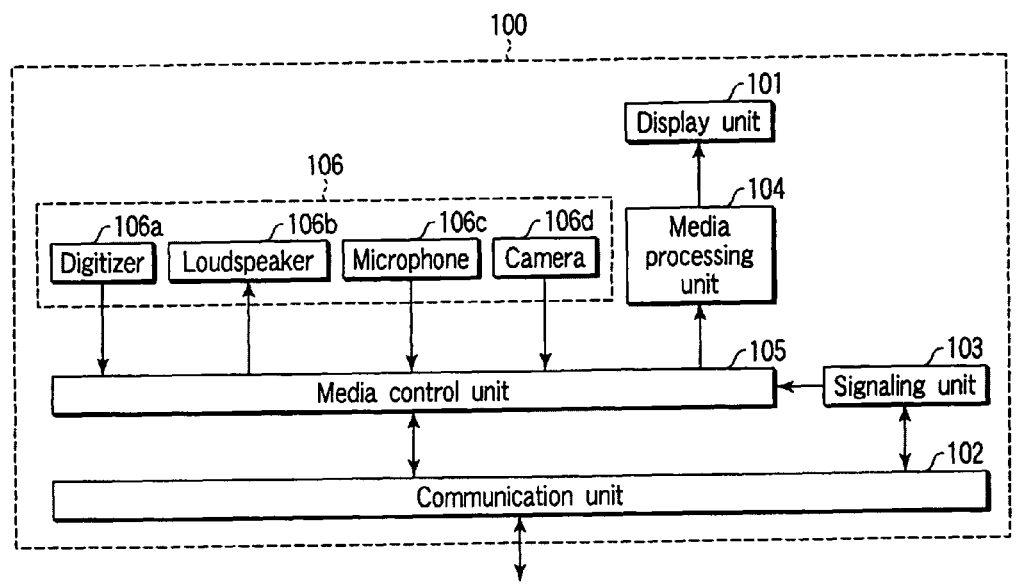
FIG. 1 is a block diagram showing the arrangement of a display terminal according to an embodiment.
Figure 2:
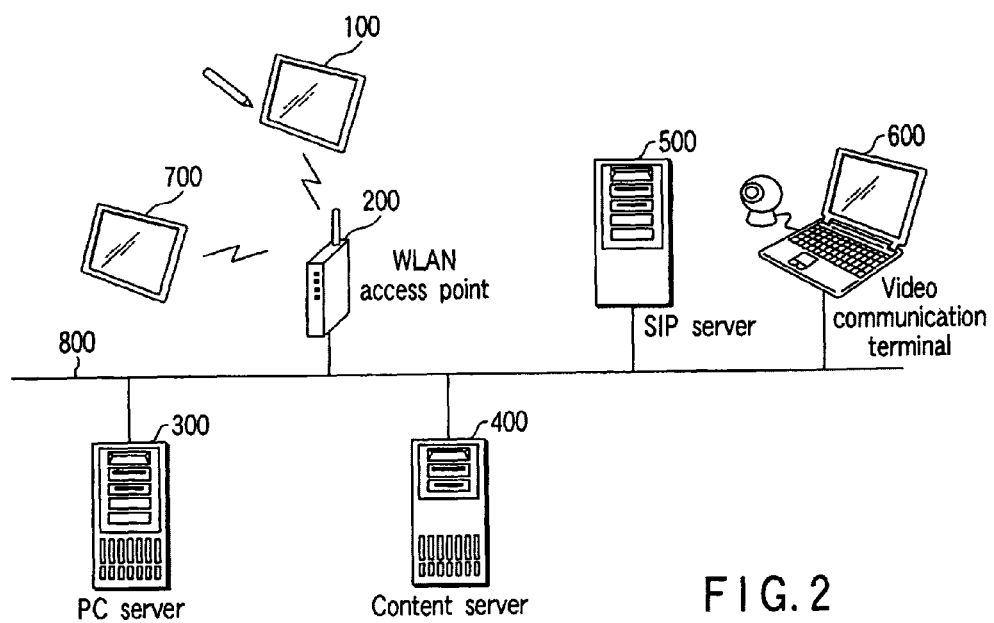
FIG. 2 is a view showing a network system including the display terminal according to the embodiment.

FIG. 1 is a block diagram showing a communication apparatus 100 (to be referred to as a display terminal 100 hereinafter) according to an embodiment. As shown in FIG. 2, the display terminal 100 is connected to a network 800 through a WLAN (Wireless Local Area Network: wireless LAN) access point 200. The WLAN access point 200 is, for example, a wireless communication access point apparatus which can be used for wireless IP (Internet Protocol) communication like communication in a wireless LAN defined by the IEEE802.11 standard.

Assume that the display terminal 100 and the WLAN access point 200 are in a state wherein they can communication with each other through a connection procedure complying with the IEEE802.11 standard or the like. This allows the display terminal 100 to communicate with a PC server 300, content server 400, SIP (Session Initiation Protocol) server 500, video communication terminal 600, and the like which are connected to the network 800. The display terminal 100 can also perform IP communication with another display terminal 700 through the WLAN access point 200.

The PC server 300 is connected to the display terminal 100 through the network 800, and transmits, to the display terminal 100, the image data (application window data) of a graphic desktop window generated by an operating system, desktop environment software, and application program which operate on the PC server 300.

The PC window sharing technique disclosed in, for example, JP-A 2005-249841 (KOKAI) is applied to the PC server 300. Every time the graphic desktop window generated by the PC server 300 is updated, the PC server 300 transmits the resultant image data to the display terminal 100. In this case, the PC server 300 transmits image data upon compressing and coding the data by using an image compression scheme (JPEG) determined in advance between the PC server 300 and the display terminal 100. Although described in detail later, the display terminal 100 displays image data transmitted from the PC server 300, and when receiving a control input from the user with respect to the displayed image data, transmits the control input data to the PC server 300. The PC server 300 operates an application program in accordance with the transmitted control input data to update the graphic desktop window, and transmits the new image data to the display terminal 100.

Allowing the display terminal 100 to control an application program and the like operating on the PC server 300 eliminates the necessity of calculating ability for the operation of an application program and the like.

The content server 400 is a server apparatus storing content data containing moving images, and provides stored content data to another terminal apparatus on the network by transmitting it in response to a request from the terminal apparatus. The content server 400 transmits content data in accordance with the video image stream transfer and display procedures defined in the DLNA (Digital Living Network Alliance) standard. Note that content data may be video data or the like personally recorded by a general user and uploaded into the content server 400 as well as, for example, movie and TV program data.

The content server 400 transmits image data upon compressing and coding the data by using an image compression scheme (MPEG2) determined in advance between the content server 400 and the display terminal 100 as in the above case of image data transmission from the PC server 300. The following description is based on the assumption that the content server 400 transmits content data to the display terminal 100 in accordance with the DLNA standard described above. However, the content data transmission procedure to be used is not limited to that complying with the DLNA standard described above. For example, the content server 400 may transmit content data in accordance with another standard such as RTSP (RealTime Streaming Protocol).

The video communication terminal 600 is a terminal which performs video communication with the display terminal 100 through the SIP server 500. In this case, video communication is communication which allows users to make conversation in real time while watching a picture of a speaker by transmitting/receiving video data (video image data) and audio data between communication terminals connected to each other through a network. In this case, signaling between terminals through the SIP server 500 is performed in accordance with, for example, the method defined by RFC3261.

First of all, the display terminal 100 transmits an INVITE request to the video communication terminal 600 through the SIP server 500. Upon receiving the INVITE request, the video communication terminal 600 returns a response in response to the request, thereby establishing communication between the display terminal 100 and the video communication terminal 600. At this time, the display terminal 100 and the video communication terminal 600 agree on a communication scheme used for communication, a compression scheme for data transmission/reception, and the like. Assume that image data to be transmitted/received between the display terminal 100 and the video communication terminal 600 has been compressed and coded by a predetermined compression scheme (MPEG4).

In the following description, the display terminal 100 and the video communication terminal 600 establish communication through the SIP server 500 in accordance with the procedure defined by SIP. However, the procedure for communication establishment need not be limited to that defined by SIP. For example, such operation may comply with UPnP (Universal Plug and Play) which is another communication device/service discovery procedure. Alternatively, it suffices to selectively use these communication procedures in accordance with applications.

As described above, the display terminal 100 can connect to the PC server 300, content server 400, and video communication terminal 600 through the network 800 and use services such as the use of application programs operating on the PC server 300, viewing/listing of content data stored in the content server 400, and video communication with the video communication terminal 600 by communicating with the servers and the communication terminal.

In the following description, services which the display terminal 100 can use between itself and the PC server 300, content server 400, and video communication terminal 600 will be respectively referred to as "PC operation", "video viewing/listening", and "video communication".

As described above, image data transmitted/received between the display terminal 100 and the PC server 300, content server 400, and video communication terminal 600 are respectively compressed by JPEG, MPEG4, and MPEG2. Each of these compression schemes is a compression scheme of executing quantization processing after DCT (Discrete Cosine Transform) which is orthogonal transformation of transforming two-dimensional image data into data in a spatial frequency domain. This makes it possible to implement dequantization processing and inverse DCT processing, which require calculation resources and a large circuit size, in decoding image data compressed by these schemes, using the same processing circuit regardless of the compression scheme of image data. In this manner, the compression schemes of data to be transmitted/received in the respective services are unified into a scheme of performing DCT and quantization processing, and dequantization processing and inverse DCT processing used for decoding are implemented by a single processing circuit. This can reduce the circuit size required for decoding and achieve a reduction in the size of the display terminal 100.

The arrangement of the display terminal 100 according to an embodiment will be described next with reference to FIG. 1.

The display terminal 100 comprises a display unit 101 which displays image data, a communication unit 102 which is a communication interface for transmitting/receiving data by wireless communication, a signaling unit 103 for establishing communication between the display terminal 100 and another communication terminal through the communication unit 102, a media processing unit 104 which generates display image data to be displayed on the display unit 101 by decoding image data transmitted from another communication apparatus through the communication unit 102, and a media control unit 105 which switches the decoding schemes in the media processing unit 104 in accordance with the compression scheme of image data received by the communication unit 102.

The display terminal 100 also comprises a user interface unit 106 for receiving an audio input, pen input, or the like from the user and outputting audio data transmitted from another communication terminal through the communication unit 102.

Note that the media control unit 105 receives media data such as audio data or image data input from the user interface unit 106, and media data such as audio data or image data received by the communication unit 102. The media control unit 105 analyzes media data and sends the resultant data to an appropriate functional block (e.g., the media processing unit 104, a digitizer 106*a*, a loudspeaker 106*b*, a microphone 106*c*, or a camera 106*d*). For example, the media control unit 105 packets the data obtained from the microphone 106*c* or the camera 106*d*, and transmits each packet to another communication terminal and a server apparatus on the network 800 through the communication unit 102. Upon receiving media data from another communication terminal or a server apparatus through the communication unit 102, the media control unit 105 analyzes the media data and sends audio data to the loudspeaker 106*b* and compressed image data to the media processing unit 104.

The media processing unit 104 generates display image data by decoding the compressed image data sent from the media control unit 105 in accordance with the compression scheme of the image data. At this time, the decoding schemes in the media processing unit 104 are switched in accordance with the compression scheme of the image data under the control of the media control unit 105. Switching the decoding schemes by the media control unit 105 and the operation of the media processing unit 104 will be described in detail later. The display image data generated by the media processing unit 104 is sent to the display unit 101 and displayed.

Figure 3:
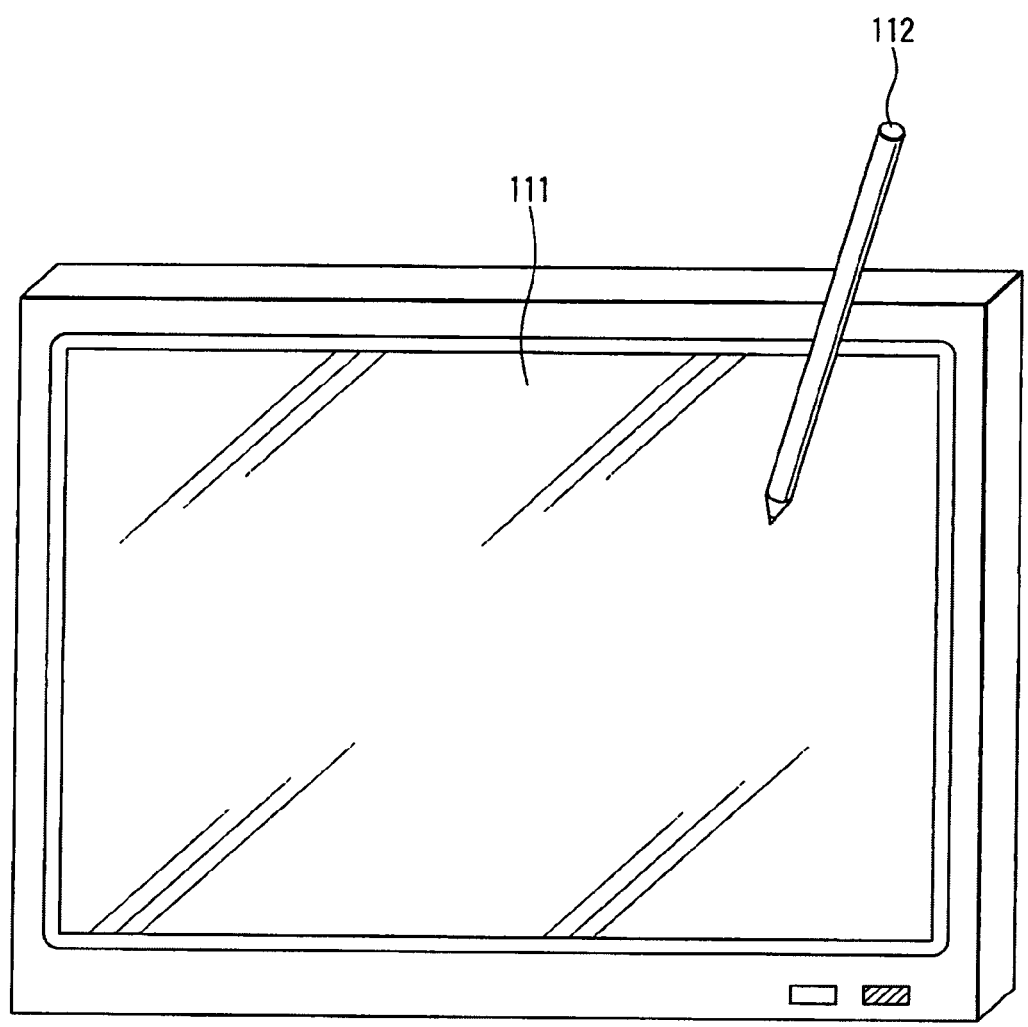
FIG. 3 is a view showing an outer appearance of the display terminal according to the embodiment.

FIG. 3 shows the outer appearance of the display terminal 100 according to the embodiment. The display unit 101 comprises a liquid crystal monitor 111 and the like. The user can view/listen to content data transmitted from another server apparatus on the network by viewing/listening to the display image displayed on the liquid crystal monitor 111. The display terminal 100 comprises a pen device 112 for receiving a pen input from the user. The pen device 112 is mainly used when the display terminal 100 is sharing a window with the PC server 300. The digitizer 106*a* digitizes the data input by the pen device 112, and the media control unit 105 packets the data. The resultant data is then transmitted to the PC server 300 on the network 800 through the communication unit 102.

The operation of the display terminal 100 in a case wherein the display terminal 100 communicates with each of the PC server 300, content server 400, and video communication terminal 600 will be described in detail mainly with reference to the operations of the media processing unit 104 and media control unit 105.

A case wherein the display terminal 100 communicates with the content server 400 will be described first. That is, in this case, the user of the display terminal 100 receives content data stored in the content server 400 and views/listens to the data ("video viewing/listening").

The signaling unit 103 of the display terminal 100 discovers the content server 400 through the communication unit 102, and acquires a list of video contents stored in the content server 400. The display unit 101 presents the acquired list of video contents to the user. The user selects a content which he/she wants to view/listen to from the presented list of video contents (by using a device such as a pen input device). The signaling unit 103 transmits the selected video content information to the content server 400 through the communication unit 102. The signaling unit 103 notifies the media control unit 105 of a message indicating the start of viewing/listening of the content. Through this procedure, the user can view/listen to the selected content data.

Assume that the above procedure of discovering the content server 400, acquiring a list of content data, and determining a content to be viewed/listened to complies with the procedure defined by UPnP-AV signaling (see, for example, the specifications described at http://www.upnp.org/StandardizeddcpS/mediaserver.asp). FIG. 4 is a view showing a communication sequence in a case wherein the signaling unit 103 communicates with the content server 400 in accordance with the UPnP-AV signaling procedure, and the user views/listens to content data.

As shown in FIG. 5, a message indicating the start of viewing/listening of a content, which is sent from the signaling unit 103 to the media control unit 105, contains the type of service to be used ("video viewing/listening"), the type of media stream ("MPEG2-PS (program stream)"), and the URI (Uniform Resource Identifier: "http://192.168.0.200:20080/RD_00010001_VRO.csi") of the content. Assume that in this case, "192.168.0.200" is the IP address of the content server 400.

Upon receiving a message notification from the signaling unit 103, the media control unit 105 initializes the decoding scheme of the media processing unit 104 in accordance with the type of media stream contained in the received message so as to correspond to the image data compressed by MPEG2. The initializing operation of the media processing unit 104 will be described later. The media control unit 105 also establishes communication with the content server 400 through the communication unit 102 by using TCP, and transmits a message requesting to view/listen to content data to the content server 400. As described above, since the procedure of transferring content data between the display terminal 100 and the content server 400 complies with the stream transfer procedure defined by the DLNA standard, a request for content data is issued by using an "HTTP-GET" like that shown in FIG. 6.

Upon receiving the message requesting to view/listen to the content data from the display terminal 100, the content server 400 compresses, by MPEG2, the content data, of the stored content data, for which the viewing/listening request has been received, and transmits the compressed data to the display terminal 100. FIG. 7 shows the structure of the data transmitted from the content server 400 at this time.

The media control unit 105 analyzes the data transmitted from the content server 400 and extracts the image data and audio data compressed by MPEG2. Note that whether compressed data is image data or audio data can be determined by dividing MPEG2-PS data into PESs (Packed Elementary Streams) and checking the stream ID of each PES. The media control unit 105 sends the extracted audio data to the loudspeaker 106b. At this time, if the audio data has been compressed, the media control unit 105 performs decoding processing corresponding to the compression scheme and sends the resultant data to the loudspeaker 106b. On the other hand, the media control unit 105 sends the extracted image data to the media processing unit 104.

Since the media processing unit 104 has been initialized by the media control unit 105 to decode image data compressed by MPEG2, the media processing unit 104 can generate display image data by performing dequantization processing, inverse DCT processing, and the like for the sent image data. The display image data generated in this manner is sent to the display unit 101 and presented to the user.

The above is the operation of the display terminal 100 in a case wherein the user is to view/listen to content data stored in the content server 400.

A case wherein the display terminal 100 communicates with the video communication terminal 600 will be described next. That is, in this case, the user of the display terminal 100 establishes communication with the video communication terminal 600 through the SIP server 500 and performs "video communication". FIG. 8 shows a communication sequence between the display terminal 100 and the video communication terminal 600 in a case of video communication.

The signaling unit 103 of the display terminal 100 registers the display terminal 100 in the SIP server 500, and issues a connection request to the video communication terminal 600 through the SIP server 500. The display terminal 100 performs registration in the SIP server 500 and issues a connection request to the video communication terminal 600 in accordance with the SIP standard. When signaling based on SIP is complete and communication between the display terminal 100 and the video communication terminal 600 is established, the signaling unit 103 of the display terminal 100 notifies the media control unit 105 of a message indicating the start of video communication. The message indicating the start of video communication, which is sent from the signaling unit 103 to the media control unit 105, contains the type of service to be used ("video communication"), the type of media stream ("RTP/MPEG4"), and the IP address ("192.168.0.100") of the video communication terminal 600 as a connection destination, as shown in FIG. 9.

Upon receiving the message notification from the signaling unit 103, the media control unit 105 initializes the decoding scheme of the media processing unit 104 to correspond to image data compressed by MPEG4 in accordance with the type of media stream contained in the received message. The initializing operation of the media processing unit 104 will be described later.

The media control unit 105 transmits and receives audio data and image data (video data) to and from the video communication terminal 600 through the communication unit 102. Assume that in this case, audio data and image data are separately transmitted and received in accordance with RTP (Real-time Transport Protocol). Note that RTP is a transmission protocol for streaming playback of sound and pictures. Transmission and reception of data based on RTP are defined in RFC3016 or the like. Upon receiving data transmitted from the video communication terminal 600 through the communication unit 102, the media control unit 105 extracts image data compressed by MPEG4 from the received data.

FIG. 10 is a view showing the structure of data transmitted from the video communication terminal 600, which contains image data compressed by MPEG4. The media control unit 105 constructs the data (compressed image data) of one video frame by arranging RTP payloads contained in data whose "Time Stamp" data in RTP headers are identical to each other in order of sequence numbers. The media control unit 105 then sends the constructed data to the media processing unit 104.

Since the media processing unit 104 has been initialized by the media control unit 105 to decode image data compressed by MPEG4, the media processing unit 104 can generate display image data by performing dequantization processing, inverse DCT processing, and the like for the sent image data. The generated display image data is sent to the display unit 101 and presented to the user.

The media control unit 105 sends the audio data contained in data transmitted from the video communication terminal 600 to the loudspeaker 106b. At this time, if the audio data is compressed, the media control unit 105 sends the data to the loudspeaker 106b upon performing decoding processing corresponding to the compression scheme.

In video communication, the display terminal 100 receives image data and audio data transmitted from the video communication terminal 600 and presents them to the user, and transmits audio data and image data (video data) input from the microphone 106c and the camera 106d to the video communication terminal 600. The media control unit 105 encapsulates these data into an RTP packet, and transmits it to the video communication terminal 600 through the communication unit 102. At this time, the camera 106d or the media control unit 105 may compress the image data by MPEG4.

The above is the operation of the display terminal 100 in performing video communication with the video communication terminal 600.

A case wherein the display terminal 100 communicates with the PC server 300 will be described next. That is, in this case, the user of the display terminal 100 performs "PC operation" by sharing a desktop window generated by an operating system or application program operating on the PC server 300.

FIG. 11 shows a communication sequence between the display terminal 100 and the PC server 300 in PC operation.

The signaling unit 103 of the display terminal 100 discovers the PC server 300 by the signaling procedure complying with UPnP remote UI (User Interface) and grasps the function of the server. Note that the signaling procedure complying with UPnP remote UI is described in detail in, for example, the specifications written at http://www.upnp.org/Standardizeddcps/remoteui.asp.

When discovering the display terminal 100 and the PC server 300, the signaling unit 103 notifies the media control unit 105 of a message indicating the start of PC operation.

The message indicating the start of PC operation, which is sent from the signaling unit 103 to the media control unit 105, contains the type of service to be used ("PC operation"), the type of media stream ("JPEG"), and the IP address ("192.168.0.1") of the PC server 300 as a connection destination.

Upon receiving the message notification from the signaling unit 103, the media control unit 105 initializes the decoding scheme of the media processing unit 104 in accordance with the type of media stream contained in the received message so as to correspond to the image data compressed by JPEG. The initializing operation of the media processing unit 104 will be described later.

The media control unit 105 connects to the PC server 300 through the communication unit 102 and starts sharing a window with the PC server 300.

The PC server 300 keeps transmitting the desktop window generated by operating an application program, as application window data, to the display terminal 100 upon compressing the data by JPEG. Note that in order to reduce the size of data to be transmitted, the PC server 300 transmits only the data of an updated portion with respect to the application window data which has already been transmitted. At this time, the data to be transmitted contains the coordinate position information of the updated portion. In this case, the coordinate position information is the information of the coordinates (x, y) of the start point of the image and the image size in the (X, Y)-axis direction.

FIG. 13 is a view showing the structure of data which contains coordinate position information and application window data compressed by JPEG and is to be transmitted from the PC server 300. Upon receiving data through the communication unit 102, the media control unit 105 extracts the coordinate position information and the application window data compressed by JPEG from the received data. The media control unit 105 sends the extracted application window data and coordinate position information to the media processing unit 104.

Since the media processing unit 104 has been initialized by the media control unit 105 to decode image data compressed by MPEG, the media processing unit 104 performs decoding processing by performing dequantization processing and inverse DCT processing for the sent application window data. The media processing unit 104 specifies the updated portion of the already generated display image data by using the coordinate position information and replaces the updated portion with the decoded application window data, thereby generating new display image data. The generated display image data is sent to the display unit 101 and presented to the user. The user can obtain the processing result of an application program operating on the PC server 300 by using the displayed image data.

In PC operation, for example, the digitizer 106*a* digitizes data input from the user with the pen device 112 or the like, and the media control unit 105 transmits the data to the PC server 300 through the communication unit 102 upon packeting the data. If, for example, the user performs input operation by moving the pointer, the position or state of the pointer is digitized by the digitizer 106*a*, and the resultant data is transmitted to the PC server 300. The PC server 300 updates the position of the pointer on the basis of the transmitted data, generates new desktop window data, and transmits it to the display terminal 100.

The above is the operation of the display terminal 100 in a case wherein it shares an application window with the PC server 300, and performs PC operation.

FIG. 14 is a flowchart showing the operation of the media control unit 105 in performing "PC operation", "video viewing/listening", and "video communication" described above. Upon receiving a message notification from the signaling unit 103 (step S101), the media control unit 105 analyzes the message and determines a service to be used ("PC operation", "video viewing/listening", or "video communication") and a connection destination (step S102). The media control unit 105 initializes the media processing unit 104 on the basis of the type of media stream (MPEG2, MPEG4, or JPEG) contained in the message (steps S103*a* to S103*c*). The media control unit 105 establishes communication with the connection destination (step S104) and transmits/receives data (steps S105*a* and step S105*b*, and steps S106*a* to S106*d*). Data transmission/reception is continued until the use of the service is terminated by disconnection determination (step S107) and communication disconnection processing with the connection destination (step S108).

Figures 15, 16:
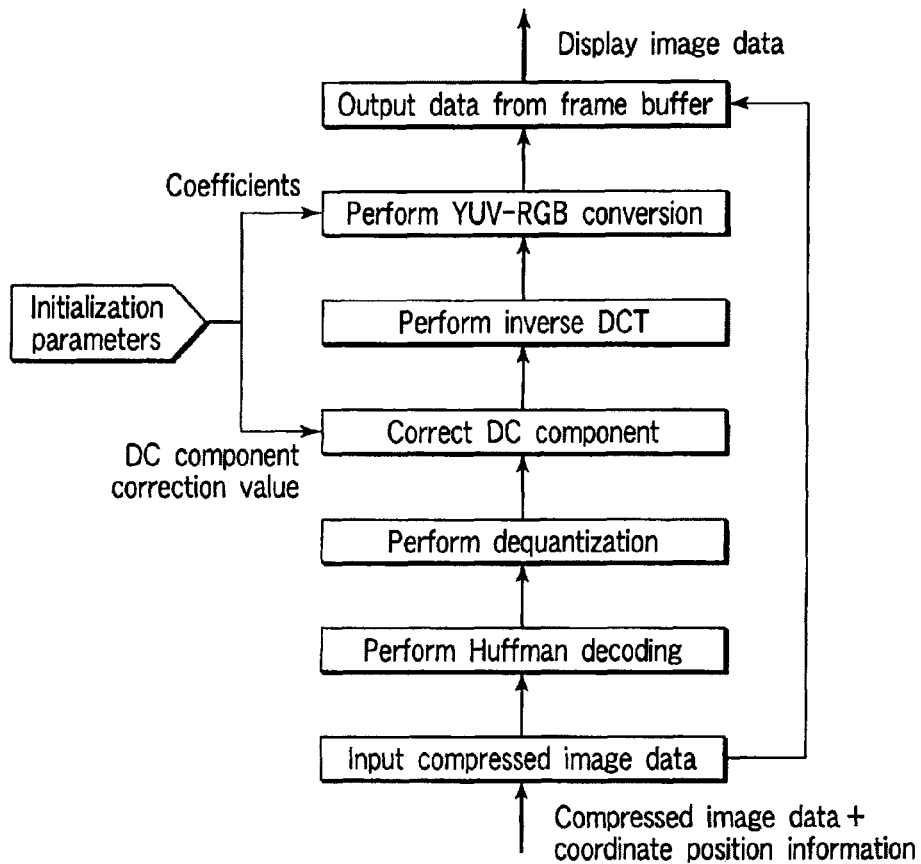
FIG. 15 is a flowchart showing decoding processing of compressed image data.
FIG. 16 is a view showing an example of set parameters for each compression scheme.

Decoding processing in the media processing unit 104 will be described last with reference to FIG. 15. Upon receiving compressed image data, the media processing unit 104 performs Huffman decoding, dequantization, DC component correction, inverse DCT, and YUV-RGB conversion with respect to the compressed image data and serves as a frame buffer to output display image data. Each of the compression schemes of image data to be transmitted/received between the display terminal 100 and the PC server 300, content server 400, and video communication terminal 600 is a compression scheme of executing quantization processing after DCT which is orthogonal transformation of transforming two-dimensional image data into data in a spatial frequency domain. This makes it possible to implement inverse DCT processing and dequantization processing by a single processing circuit in decoding image data regardless of which service the user uses.

Figure 17:
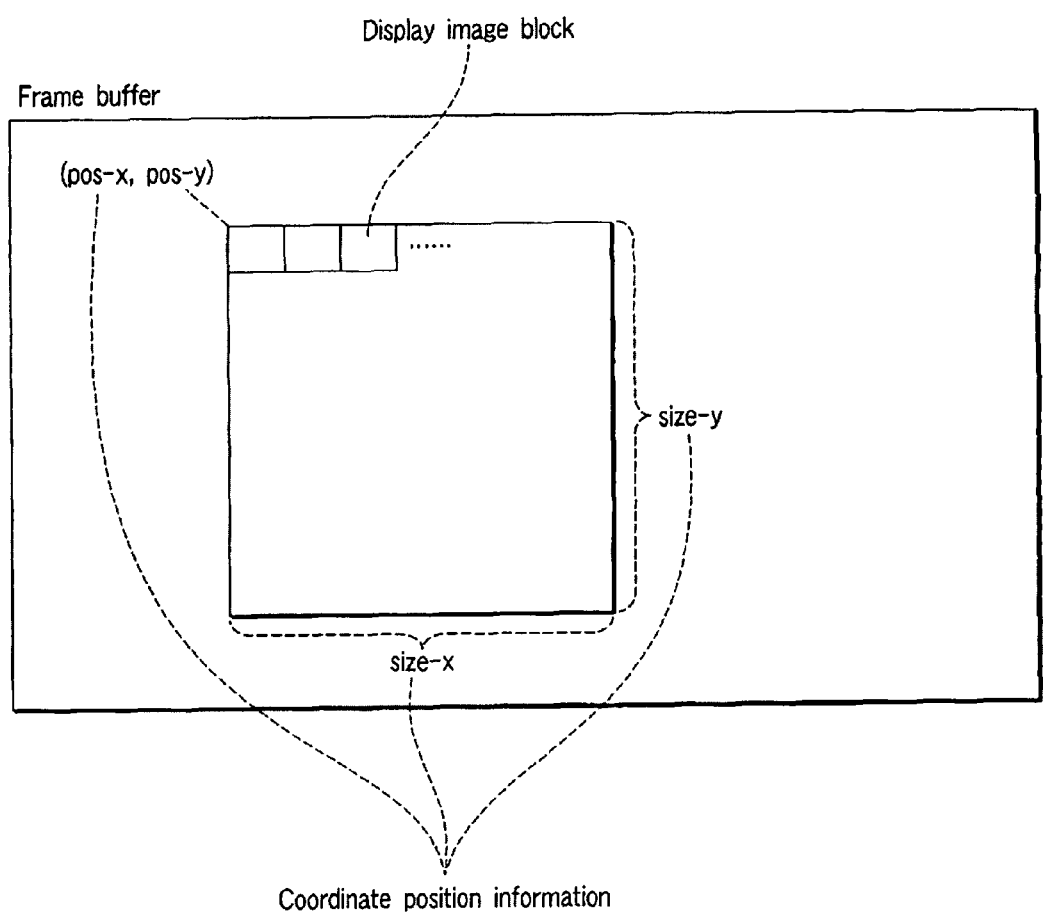
FIG. 17 is a view showing how display image data is generated.

First of all, at the time of initialization by the media control unit 105, the media processing unit 104 receives a DC component correction value and parameter coefficients used for YUV-RGB conversion computation from the media control unit 105. More specifically, the media processing unit 104 receives and uses parameter coefficients like those shown in FIG. 16 for MPEG2, MPEG4, and JPEG, respectively. In this case, the DC component correction value is a correction value to be added to data value after dequantization processing. Note that the media processing unit 104 may use, as parameter coefficients, for example, the values obtained by shifting the values shown in FIG. 16 to the left by several bits so as to convert them into integers instead of the values shown in FIG. 16. The image data obtained by YUV-RGB conversion is input to the media processing unit 104 together with compressed image data. The media processing unit 104 then generates display image data by arranging the image data on a block basis as shown in FIG. 17 on the basis of the display coordinate position information of the image data.

The above is the operation of generating display image data in the media processing unit 104.

As described above, the display terminal 100 according to the embodiment allows the user to use various services such as "PC operation", "video viewing/listening", and "video communication" by transmitting/receiving compressed image data to/from the PC server 300, content server 400, and video communication terminal 600. Each image data to be transmitted/received to/from these severs and the communication terminal is compressed by using a compression scheme which executes quantization processing after performing DCT which is orthogonal transformation of transforming two-dimensional image data into data in a spatial frequency domain. This makes it possible to implement dequantization processing and inverse DCT processing in decoding image data compressed by using these forms by using a single processing circuit. Therefore, the display terminal 100 itself can be greatly reduced in size and weight.

Note that the display terminal 100 can also be implemented by, for example, using a general-purpose computer apparatus as basic hardware. That is, the signaling unit 103, media processing unit 104, and media control unit 105 can be implemented by causing a processor incorporated in the above computer apparatus to execute programs. In this case, it suffices to implement the display terminal 100 by installing the above programs in the computer apparatus in advance or by distributing the programs upon storing them in a storage medium such as a CD-ROM or through a network and installing them in the computer apparatus as needed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A communication apparatus for decoding and displaying image data received by wireless communication, comprising:
    a display unit to display image data;
    a communication establishing unit configured to establish wireless communication with each of a first device which transmits first image data, and a second device which transmits second image data;
    a reception unit configured to receive the first image data and the second image data from the first device and the second device respectively, after wireless communication has been established by the communication establishing unit;
    a generating unit configured to generate display image data to be displayed on the display unit by decoding the received first image data and the received second image data in correspondence with compression schemes of the respective data; and
    a control unit configured to switch decoding schemes in the generating unit in correspondence with the compression schemes of the first image data and the second image data,
    wherein types of the first image data and the second image data are different from each other and each of the first image data and the second image data has been coded by using a compression scheme including orthogonal transformation processing of transforming two-dimensional image data into image data in a spatial frequency domain and quantization processing for the image data having undergone the orthogonal transformation processing, and
    the generating unit implements inverse orthogonal transformation processing and dequantization processing for decoding the first image data and the second image data by a single processing circuit.

2. The apparatus according to claim 1, wherein the first image data is application window data generated by executing an application program, the second image data is video image data for video communication, the first device is a computer, and the second device is a communication terminal.

3. The apparatus according to claim 1, wherein the first image data is application window data generated by executing an application program, the second image data is content data containing a moving image, the first device is a computer, and the second device is a content server.

4. The apparatus according to claim 1, wherein the first image data is content data containing a moving image, the second image data is video image data for video communication, the first device is a content server, and the second device is a communication terminal.

5. A control method for a communication apparatus which decodes and displays image data received by wireless communication, comprising:
    establishing wireless communication with each of a first device which transmits first image data, and a second device which transmits second image data;
    receiving the first image data and the second image data from the first device and the second device respectively, after wireless communication has been established;
    decoding the received first image data and the received second image data in correspondence with compression schemes of the respective data;
    generating display image data from the decoded image data;
    displaying the display image data; and
    controlling decoding schemes in correspondence with the compression schemes of the first image data and the second image data,
    wherein types of the first image data and the second image data are different from each other and each of the image data has been coded by using a compression scheme including orthogonal transformation processing of transforming two-dimensional image data into image data in a spatial frequency domain and quantization processing for the image data having undergone the orthogonal transformation processing, and
    inverse orthogonal transformation processing and dequantization processing for decoding the first image data and the second image data are executed by a single processing circuit.

6. A non-transitory computer readable storage medium storing instructions of a computer program for decoding and displaying image data received by wireless communication, which when executed by a computer results in performance of steps comprising:
    establishing wireless communication with each of a first device which transmits first image data, and a second device which transmits second image data;
    receiving the first image data and the second image data from the first device and the second device respectively, after wireless communication has been established;
    decoding the received first image data and the received second image data in correspondence with compression schemes of the respective data;
    generating display image data from the decoded image data;
    displaying the display image data; and
    controlling decoding schemes in correspondence with the compression schemes of the first image data and the second image data,
    wherein types of the first image data and the second image data are different from each other and each of the image data has been coded by using a compression scheme including orthogonal transformation processing of transforming two-dimensional image data into image data in a spatial frequency domain and quantization processing for the image data having undergone the orthogonal transformation processing, and
    inverse orthogonal transformation processing and dequantization processing for decoding the first image data and the second image data are executed by a single processing circuit.

* * * * *